June 17, 1958   C. J. THELANDER   2,839,222
MULTI-PURPOSE WHEELED IMPLEMENT
Filed Nov. 16, 1955   2 Sheets-Sheet 1
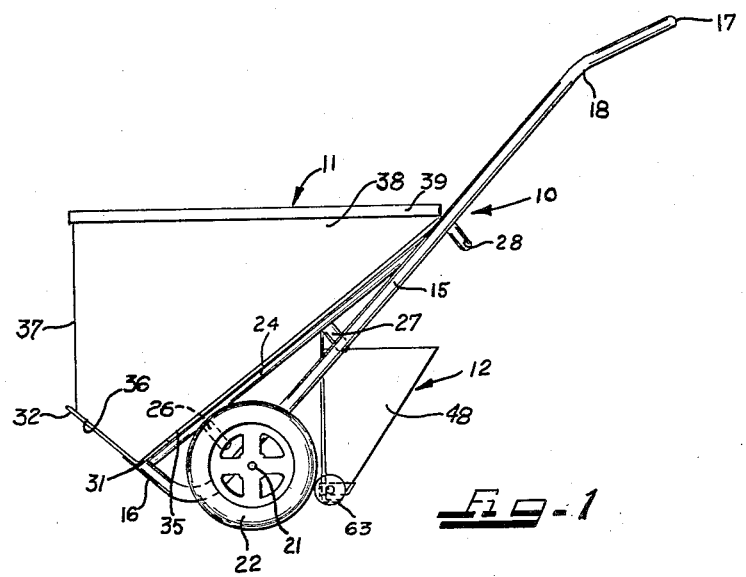
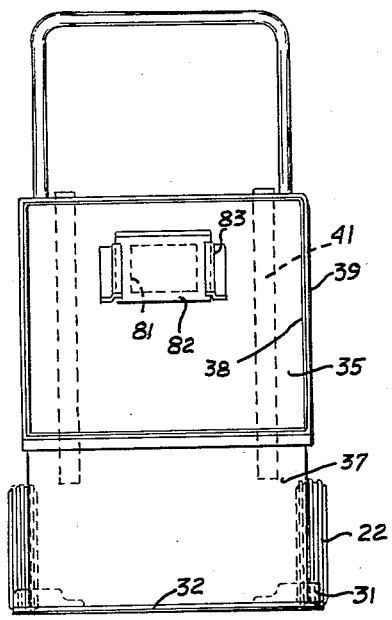
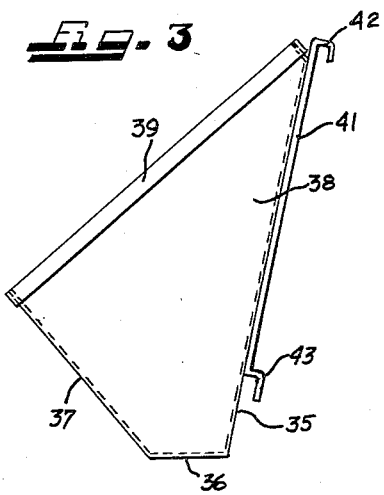
Inventor
Clement J. Thelander
McCanna and Morsbach
Atty's June 17, 1958   C. J. THELANDER   2,839,222
MULTI-PURPOSE WHEELED IMPLEMENT
Filed Nov. 16, 1955   2 Sheets-Sheet 2
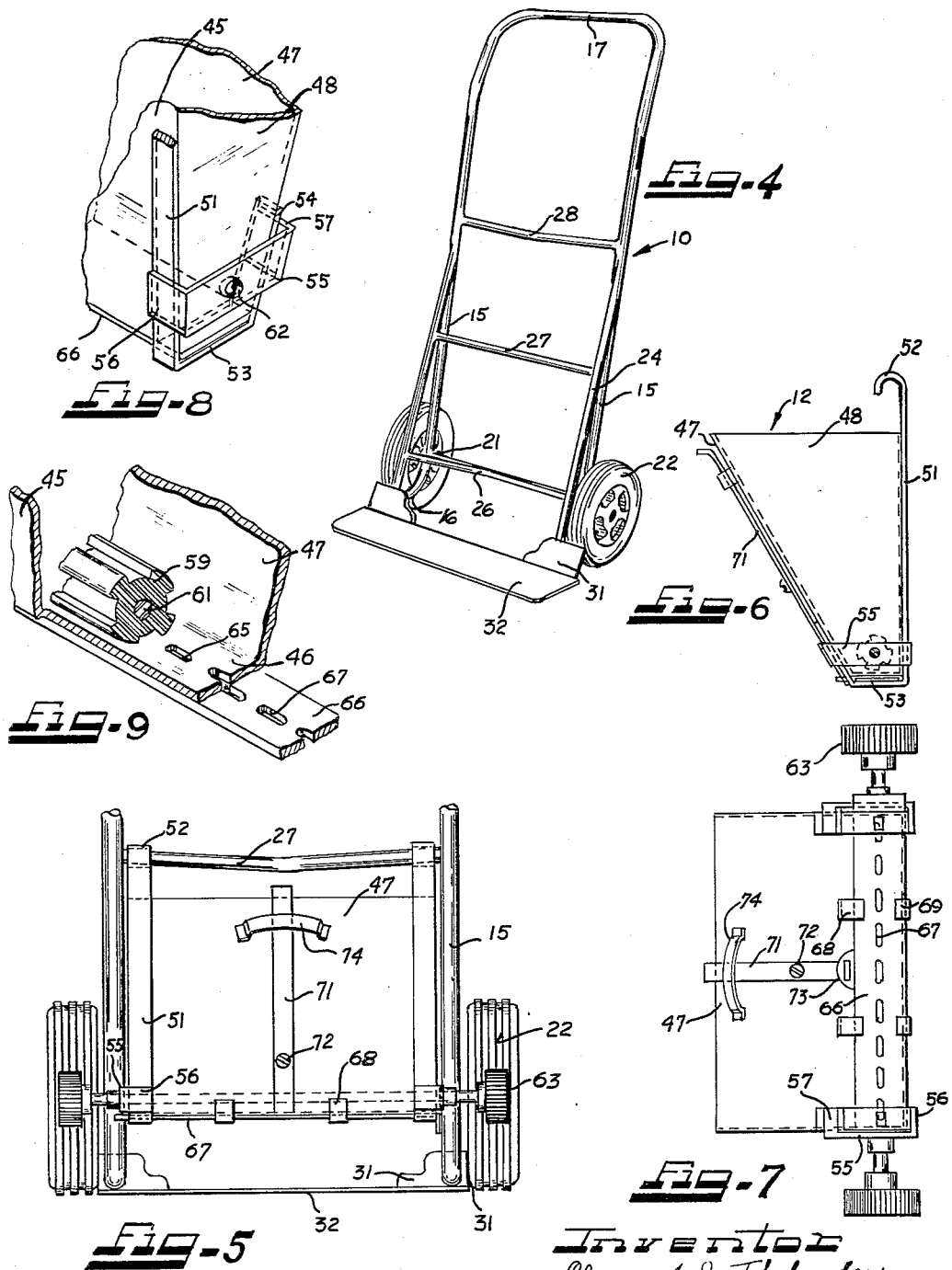
Inventor
Clement J. Thelander
McCanna and Morsbach
Atty's United States Patent Office
2,839,222
Patented June 17, 1958

2,839,222

MULTI-PURPOSE WHEELED IMPLEMENT

Clement J. Thelander, Sterling, Ill., assignor to Buffalo Eclipse Corporation, North Tonawanda, N. Y., a corporation of New York Application November 16, 1955, Serial No. 547,109

9 Claims. (Cl. 222—177)

This invention relates to multi-purpose wheeled implements and particularly to a hand truck and attachments therefor arranged to enable use of the hand truck to perform additional functions.

An important object of this invention is to provide a wheeled implement including a hand truck arranged for independent use in transporting articles together with a storage bin attachment and a spreader attachment each adapted for attachment individually or simultaneously on the truck to enable use of the truck to haul and also spread loose material.

Another object of this invention is to provide a hand truck having a storage bin attachment and a spreader attachment arranged for simultaneous use on the truck to respectively transport material to be spread and to spread the material, which storage bin and spreader are constructed and arranged on the truck to facilitate transfer of material from the bin to the spreader.

A further object of this invention is to provide an improved hand truck of simple construction arranged to be easily and economically fabricated and which is rugged and dependable in use.

Yet another object of this invention is to provide an improved storage bin particularly designed for use on a hand truck to be supported on the frame and toe plate of the truck, which bin may be readily attached to the truck and which may be dumped without disconnecting the bin from the truck.

Still another object of this invention is to provide a novel spreader attachment for use on a hand truck to spread loose material, which spreader attachment is of simple and economical construction and arranged to be readily mounted and dismounted from the truck.

These, together with various ancillary objects and advantages of the invention will be more readily appreciated as the same becomes better understood by reference to the following detailed description when taken in connection with the accompanying drawings wherein:

Figure 1 is a side elevational view of the hand truck with the storage bin and spreader attached;

Fig. 2 is a front elevational view of the hand truck having the storage bin mounted thereon;

Fig. 3 is a side elevational view of the storage bin;

Fig. 4 is a perspective view of the hand truck;

Fig. 5 is a fragmentary rear elevational view of the hand truck showing the spreader attachment mounted thereon;

Fig. 6 is a side elevational view of the spreader attachment;

Fig. 7 is a bottom plan view of the spreader attachment;

Fig. 8 is a fragmentary perspective view of the spreader attachment; and

Fig. 9 is a fragmentary perspective view of the spreader attachment with parts broken away and shown in section to illustrate details of construction.

The multi-purpose wheeled implement of the present invention in general includes a wheeled hand truck 10, a storage bin or hopper attachment 11 and a spreader attachment 12, which bin and spreader attachment are arranged to be simultaneously mounted on the truck, as shown in Fig. 1, to enable transporting of a relatively large quantity of material to be spread in the bin 11 and spreading of this material by means of the spreader 12.

The hand truck 10 is best shown in Fig. 4 and comprises spaced side members 15, conveniently formed of tubular stock and which have the lower ends thereof bent at substantially right angles thereto to form forwardly extending legs 16. A handle 17 is provided adjacent the upper end of the side members 15 and is preferably formed integrally with the spaced side members to provide a generally U-shaped frame. As best shown in Fig. 1, the side members 15 are angulated at 18 adjacent the upper ends thereof to offset the handle 17 from the plane of the side members. An axle 21 is rigidly secured, as by welding, to the side members 15 and wheels 22 are journaled on the axle to support the cart. For reasons set forth more fully hereinafter, the axle 21 is spaced from the lower edge of the forwardly projecting legs 16 a distance substantially equal to the radius of the wheels 22.

A reinforcing frame is rigidly secured to the main frame defined by the side members 15 and the forwardly extending legs 16 and includes a pair of brace members 24, also formed of tubular stock and which may be of smaller size than the stock employed in the main frame. The brace members are each secured at one end to the forward end of one of the legs 16 and at the other ends thereof to the respective side member 15 at a point approximately midway between the ends of the side members to reinforce the main frame. A plurality of cross members, also conveniently formed of tubular stock are secured to the brace members 24. Preferably, a lower cross member 26 is secured to the brace members at a point spaced above the legs 16; an intermediate cross member 27 is secured to the brace members 24, intermediate the ends of the latter; and an upper cross member 28 is secured to the side members 15 of the main frame, adjacent the juncture of the brace members 24 therewith and arranged so as to be aligned with the intermediate and lower brace members 27 and 26 respectively. As best shown in Fig. 1, each of the cross members 26—28 is longitudinally curved.

An L-shaped plate 31 is rigidly secured, as by welding, to the forward ends of the legs 16 and to the lower ends of the brace members 24 and extend outwardly from the brace members in front of the wheels 22. A toe plate 32 is rigidly secured to the forwardly extending leg of the L-shaped member 31 and extends forwardly of the cart substantially coplanar with the underside of the forwardly extending legs 16. Thus, the toe plate and legs are arranged to engage the supporting surface and support the truck 10 in an upright position as shown in Fig. 4.

The storage bin 11 is adapted to be detachably mounted on the front side of the truck 10 and includes a rear wall 35 adapted to rest upon the brace members 24 and extend from the toe plate 32 to a point adjacent the upper end of the brace members. The bottom wall 36 of the bin extends along the toe plate 32 and the front wall 37 extends upwardly from the toe plate at an angle such that the front wall is disposed substantially vertically when the truck 10 is in the position shown in Fig. 1 normally assumed during use. Opposed side walls 38 are secured to the front, bottom and rear walls and terminate with the upper edges thereof extending substantially horizontally from a point adjacent the upper end of the brace members 24 to the upper edge of the front wall 37, when the truck is in the position shown in Fig. 1. A reinforcing bar 39 is secured to the side, front and rear walls to reinforce the upper edge of the bin.

A pair of straps 41 are affixed, as by welding, to the rear wall 35 and extend therealong. As best shown in Fig. 2, the bars are spaced apart a distance less than the spacing between the side members 15 of the truck, so as to be receivable therebetween, and upper and lower downwardly facing hooks 42 and 43 respectively are formed on opposite ends of the straps. The hooks are adapted for engagement with the upper and lower cross members 26 and 27 to detachably retain the storage bin on the truck.

The spreader attachment 12 is arranged to be mounted at the rear side of the truck and operated by the ground engaging wheels 22. The spreader includes a hopper having a front wall 45, a bottom wall 46 and a rear wall 47 which diverges upwardly away from the front wall. Spaced end walls 48 are provided at opposite ends of the front and rear walls. The spreader is attached to the truck 10 by means of a pair of straps 51 secured to the front wall 45 and having hooks 52 formed on the upper ends thereof. The hooks are adapted for engagement with the intermediate cross member 27 on the truck to swingably support the spreader 12 thereof, as best shown in Fig. 1.

The straps 51, in accordance with the present invention, are formed with a rearwardly extending portion 53 which underlies the bottom wall, in spaced relation thereto and with an upwardly extending portion 54 which extends along the rear wall 47 and is rigidly secured thereto. A generally U-shaped bearing bracket 55 is provided at each end of the spreader hopper and each has one leg 56 thereof welded or otherwise secured to one of the straps 51 and the other leg 57 thereof secured to the upwardly extending portion 54 on the respective strap, as best shown in Fig. 8. An agitator 59 is disposed within the hopper to agitate the material thereat. The agitator is mounted on a shaft 61 which extends through the end walls 48 of the spreader hopper and which is journaled in bores 62 in the brackets 55. Rollers 63 are secured to the outwardly extending ends of the shaft and are arranged for engagement with the wheels 22 to be rotated thereby as the cart is advanced.

The material from the spreader hopper is dispensed through openings 65 formed in the bottom wall 46 thereof and the rate of flow of the material through these openings is controlled by a perforate distributor plate 66 having openings 67 therein. The distributor plate 66 is mounted for adjustment longitudinally of the bottom plate to control the registry of the openings 66 in the distributor with the openings in the bottom wall and conveniently the distributor plate is slidably mounted between the bottom wall and the horizontally extending portions 53 on the mounting straps 51. A plurality of L-shaped brackets 68 and 69 are affixed to the rear wall 47 and the front wall 45 and engage the distributor plate 66 to guide the intermediate portion of the latter. The position of the distributor plate is conveniently adjusted by means of a lever 71 pivoted on a pin 72 carried by the rear wall 47 of the hopper. The end of the lever 71 is receivable in the slotted tab 73 on the distributor plate and a suitable guide bracket 74 is mounted on the rear wall 47 to guide the upper end of the lever.

From the foregoing it is apparent that the storage bin 11 and the spreader 12 may be utilized simultaneously on the hand truck with the storage bin mounted at the front of the truck and the spreader 12 mounted in the rear of the truck. This enables spreading of relatively large quantities of material without having to frequently return to the source of supply. The material to be spread may be stored in the bin 11 and then transferred, as needed, into the spreader hopper. As is best shown in Fig. 1, the storage bin overlies the upper end of the spreader and conveniently an opening 81 (see Fig. 2) is provided in the rear wall 35 of the storage bin at a point which overlies the open top of the spreader 12. A closure or door 82 is provided for the opening 81 which, in the embodiment illustrated, comprises a plate slidably mounted on the brackets 83 for movement across the opening. When it is desired to transfer material from the bin to the spreader, the door 82 is moved to its open position and the truck 10 tilted downwardly, if necessary to cause the material in the bin 11 to flow into the spreader. Alternately, the material in the bin may be scraped by suitable tool through the opening 81. Since the spreader is hingedly mounted on the intermediate cross member 27 of the truck, the spreader will swing to maintain a substantially upright position as the handle of the truck is lowered. After the spreader is filled, the door 82 is closed and the cart manipulated to spread the material contained within the spreader hopper.

As is apparent from Fig. 1, the bin 11 and spreader 12, when mounted respectively at the front and rear sides of the hand truck, tend to counterbalance each other and thereby provide a more balanced assembly. Although adapted for simultaneous use on the truck, it is apparent that the bin 11 and spreader 12 may be used separately on the truck if desired.

The bin, when used on the hand truck, adapts the truck for general use in hauling loose material. The bin is constructed so that the bottom and rear walls 36 and 35 respectively rest upon the toe plate 32 and brace members 24 so that the bin is adequately supported at the underside thereof. The front wall 37 of the bin is arranged to extend upwardly in all positions of the truck from the upright position shown in Fig. 2 to the position shown in Fig. 1 assumed when the truck is in use. This enables loading of the bin when the truck is in its upright position. The toe plate extends to a point adjacent the front wall 37 of the bin, and preferably forwardly thereof as shown so that the toe plate supports the truck when the latter is tilted forwardly to dump the material from the bin.

The spreader attachment 12 is mounted for swinging movement on the truck and is so arranged that the weight of the spreader, and the material contained in the spreader hopper, urges the rollers 63 into engagement with the wheels 22 on the truck and thus enables rapid attachment and detachment of the spreader from the truck. The mounting straps 51 are arranged to form a supporting cradle for the spreader hopper and also guidably support the distributor plate to thereby provide a rugged and simple spreader construction.

I claim:

1. A wheeled household tool comprising a hand truck including a frame having a handle portion at its upper end and support wheels mounted at the lower end thereof, a spreader attachment including a spreader hopper having an open top, a dispensing mechanism at the lower end of said hopper including an operating roller disposed outside of said hopper, means for attaching said spreader hopper to one side of said frame intermediate the ends of the latter with the operating roller in engagement with one of said wheels to operate the dispensing mechanism as the cart is advanced, a storage bin for loose material, and means attaching said storage pin to said frame at the other side thereof.

2. A wheeled household tool comprising a hand truck including a frame having a handle portion at its upper end and support wheels mounted at the lower end thereof, a spreader attachment including a spreader hopper having an open top, a dispensing mechanism at the lower end of said hopper including an operating roller disposed outside of said hopper, means for attaching said spreader hopper to one side of said frame intermediate the ends of the latter with the operating roller in engagement with one of said wheels to operate the dispensing mechanism as the cart is advanced, a storage bin for loose material, and means attaching said storage bin to said frame at the other side thereof, said storage bin having a portion overlying said open top of said spreader hopper and a discharge opening in said portion which overlies the spreader hopper and arranged to permit material from the storage bin to be dispensed into the spreader hopper.

3. A wheeled household tool comprising a pair of spaced frame members, a handle on the upper ends of said frame members, support wheels rotatably mounted adjacent the lower ends of said frame members, a plurality of cross members attached to said frame members at longitudinally spaced points on said frame members, a spreader attachment including a spreader hopper having an open top, a dispensing mechanism at the lower end of said spreader hopper having an operating roller disposed outside said hopper, means for swingably attaching the upper end of said hopper to an intermediate one of said cross members with said roller in engagement with one of said wheels to operate the dispensing mechanism, a storage bin for loose material, said bin having a rear wall extending alongside said frame to a point adjacent an upper cross member above said intermediate cross member, and means for attaching said bin to said upper cross member.

4. A wheeled household tool comprising a pair of spaced frame members, a handle on the upper ends of said frame members, support wheels rotatably mounted adjacent the lower ends of said frame members, a plurality of cross members attached to said frame members at longitudinally spaced points on said frame members, a spreader attachment including a spreader hopper having an open top, a dispensing mechanism at the lower end of said spreader hopper having an operating roller disposed outside said hopper, means for swingably attaching the upper end of said hopper to an intermediate one of said cross members with said roller in engagement with one of said wheels to operate the dispensing mechanism, a storage bin for loose material, said bin having a rear wall extending alongside said frame to a point adjacent an upper cross member above said intermediate cross member, and means for attaching said bin to said upper cross member, said rear wall of said storage bin having an opening therein located between said intermediate and said upper cross members for dispensing material from the storage bin into said spreader hopper.

5. A wheeled household tool comprising a hand truck including a frame having a handle portion at its upper end and support wheels mounted at the lower end thereof, said frame having a toe plate attached to the lower end thereof and extending forwardly of the front side of said frame to engage the ground and support said frame in an upright position, said frame being arranged to be inclined rearwardly to move said toe plate out of engagement with the ground and permit movement of the truck on said support wheels, said truck having a cross member disposed intermediate its upper and lower ends, a spreader attachment on said truck including a hopper, said hopper including opposed side and end walls and a bottom wall, a pair of straps attached to one of said side walls and having hooks formed on the upper ends thereof adapted for engagement with said cross member on the truck to swingably support the hopper on the rear side of the truck with the hopper extending downwardly from the frame, said straps extending downwardly along said one side wall and having portions extending below said bottom wall and upwardly along the other of said side walls, brackets secured to said straps and extending along said end walls, and a rotary dispensing mechanism disposed in said hopper and journaled in said brackets, said dispensing mechanism including a drive roller disposed externally of said hopper and adapted for engagement with one of said wheels on said truck.

6. A wheeled household tool comprising a hand truck including a frame having a handle portion at its upper end and support wheels mounted at the lower end thereof, said truck having a cross member disposed intermediate its upper and lower ends, a toe plate of the lower end of said frame extending forwardly of the front side thereof and arranged to engage the ground and support said frame in an upright position, said frame being arranged to be inclined rearwardly to raise the toe plate out of engagement with the ground and permit movement of the truck on said support wheels, a spreader attachment on said truck including a hopper, said hopper including opposed side and end walls and a bottom wall having discharge openings therein, a pair of straps having hooks on the ends thereof adapted for engagement with said cross member on the truck and extend downwardly therefrom at the rear side of said truck, said straps extending downwardly along one of said side walls and having portions extending below the bottom wall and upwardly along the other side wall, a bracket attached to each of said straps and extending across the end walls of the hopper, a rotary agitator disposed in said hopper and journaled in said brackets, a distributor plate slidably disposed between said bottom wall and the portions on said straps which underlie the bottom wall, said distributor plate having openings therein adapted to register with the openings in said bottom wall, means on said hopper for adjusting said distributor plate, and rollers on said agitator engageable with said wheels for driving the agitator as the truck is advanced.

7. A wheeled household implement comprising a hand truck having spaced side frames, a plurality of cross members secured to said side frames and extending therebetween, wheels mounted on said frames adjacent the lower ends thereof, a toe plate secured to said frames and extending forwardly therefrom, said toe plate being disposed in a plane spaced from the axis of said wheels a distance equal to the radius of the wheels and adapted to engage the ground to support said frames in an upright position, said truck being arranged to be tilted from said upright position to an inclined position in which the toe plate is raised out of engagement with the ground when moving the truck, a bin attachment for said truck including a rear wall arranged to extend along said side frames from the toe plate to a point intermediate the ends of said side frames, a bottom wall on the lower end of said rear wall and extending along said toe plate, a front wall extending upwardly from said bottom wall and diverging upwardly from the plane of said rear wall at an angle such that the front wall is disposed substantially vertically when the truck is in said inclined position, said front wall being shorter than said rear wall, side walls attached to said front and rear walls and having the upper edges thereof disposed substantially perpendicular to said front wall to extend horizontally when the truck is in said inclined position, and hooks on said rear wall engageable with said cross members to retain said bin on said truck.

8. The combination of claim 7 wherein said toe plate extends forwardly of said bottom wall to permit tilting of the truck forwardly on said toe plate to dump the material from the bin.

9. A wheeled household implement comprising a hand truck having spaced side members, forwardly extending legs on the lower ends of said side members, wheels mounted on said side members spaced from said legs, brace members attached to said side members approximately midway of the ends thereof and extending downwardly at an acute angle thereto to the forward ends of said legs, said brace members defining a plane disposed forwardly of said wheels, a plurality of cross members secured to said brace members and extending therebetween, a toe plate on the lower ends of said brace members disposed in a plane offset from the axis of said wheels a distance equal to the radius of said wheels and adapted to engage the ground to support the truck in an upright position, said truck being arranged to be tilted from said upright position to a rearwardly inclined position in which the toe plate is out of engagement with the ground when moving the truck, a bin attached to said truck including a rear wall disposed on said brace members and substantially coextensive therewith, a bottom wall disposed on said toe plate, a front wall extending upwardly from said bottom wall and diverging upwardly from the plane of said rear wall at an angle such that the front wall extends substantially vertically when said truck is in said inclined position, said front wall being shorter than said rear wall, opposed side walls attached to said front and rear walls and having the upper edges thereof disposed substantially perpendicular to said front wall to extend horizontally from the upper edge of the rear wall when the truck is in said inclined position, and hooks attached to said rear wall and engageable with said cross members to detachably secure the bin on said truck.

References Cited in the file of this patent

UNITED STATES PATENTS

| | | |
|---|---|---|
| 980,485 | Brown | Jan. 3, 1911 |
| 1,160,887 | Hatfield | Nov. 16, 1915 |
| 1,319,530 | Nies | Oct. 21, 1919 |
| 1,679,325 | Black | July 31, 1928 |
| 2,180,253 | Moore | Nov. 14, 1939 |
| 2,464,709 | Orsini | Mar. 15, 1949 |
| 2,728,492 | Fox | Dec. 27, 1955 |

FOREIGN PATENTS

| | | |
|---|---|---|
| 47,673 | France | June 16, 1937 |